United States Patent [19]

Miller

[11] Patent Number: 5,182,505
[45] Date of Patent: Jan. 26, 1993

[54] AIRCRAFT CONTROL SURFACE POSITION TRANSDUCER

[75] Inventor: Harry Miller, Scottsdale, Ariz.

[73] Assignee: Honeywell Inc., Minneapolis, Minn.

[21] Appl. No.: 717,759

[22] Filed: Jun. 19, 1991

[51] Int. Cl.⁵ .............................................. B64C 13/30
[52] U.S. Cl. ................................... 318/565; 318/586; 244/232; 74/40
[58] Field of Search ............... 318/565, 584, 586, 652; 244/75 R, 184, 194, 223, 228, 230, 232, 233; 74/40; 364/424.06, 434

[56] References Cited

U.S. PATENT DOCUMENTS

| | | | |
|---|---|---|---|
| 3,679,156 | 7/1972 | Redmond, Jr. | 318/564 X |
| 4,649,484 | 3/1987 | Herzog et al. | 364/424 |
| 4,915,016 | 4/1990 | Burandt | 91/482 |
| 4,947,070 | 8/1990 | Hill et al. | 310/80 |
| 4,970,861 | 11/1990 | Randall | 60/431 |

Primary Examiner—Bentsu Ro
Attorney, Agent, or Firm—Arnold L. Albin

[57] ABSTRACT

A retrofit apparatus for providing a signal indicative of the position of an aircraft control surface comprises a rotary coupling flexibly coupled to the control surface, an extensible coupling driven by the rotary coupling, a quadric-chain linkage coupled to the extensible coupling for converting a linear output into a substantially translatory displacement, a linkage for converting the translatory displacement into a substantially angular motion, and a transducer coupled to the linkage for converting the angular motion into an electrical output indicative of the position of the aircraft control surface. The invention is a simple modification to an existing quadric-chain linkage driving a mechanical indicator, enabling an electrical transducer to be retrofitted in the crowded control stand of an aircraft.

7 Claims, 2 Drawing Sheets

AIRCRAFT CONTROL SURFACE POSITION TRANSDUCER

BACKGROUND OF THE INVENTION

1. Field of the Invention

The invention relates to a transducer which transforms the mechanical position of an aircraft control surface such as a horizontal stabilizer into an electrical signal for use in other aircraft subsystems. The invention is particularly applicable to retrofit installation into aircraft which were not originally designed to have such electrical outputs.

2. Description of the Prior Art

The position of the aircraft's horizontal stabilizer surface is generally controlled by electric or hydraulic actuators. In a typical electric actuator installation, the position is determined by an irreversible jackscrew which is turned by either of two motors, remotely operated by switch inputs from the pilots in the cockpit. Further inputs to the stabilizer jackscrew are provided by hand-operated wheels which are conveniently located to the Captain and the First Officer in the cockpit. These wheels rotate a relatively large number of turns to cover the full range of stabilizer operation and are connected to the jackscrew by cabling from the cockpit to the rear of the aircraft where the stabilizer is located. The cockpit wheels rotate whenever there is an input to the jackscrew, whether electric or manual; thus, providing a positive visual cue to the pilots that the stabilizer is moving. Since the wheels rotate many turns over the full range of stabilizer movement, it is also necessary to provide a limited range visual displacement cue to the pilots. This takes the form of mechanical displacement of a pointer covering an arc of about 40 degrees, corresponding somewhat linearly with a stabilizer movement of about 17 degrees. In older aircraft there was no requirement for an electrical output which reflected the position of the horizontal stabilizer. With the advent of new requirements such as retrofit of windshear detection devices, it is necessary to provide such electrical signals, which are difficult to obtain because of very crowded conditions that exist in the pedestal control stand between the Captain and First Officer.

The present invention adapts an existing quadric-chain pointer drive mechanism to actuate an electrical transducer which is remotely located. It provides a substantially linear rotation range of about 35 degrees with a corresponding signal output with minimum modification of the existing mechanism.

SUMMARY OF THE INVENTION

The invention modifies one of the members of a quadric-chain mechanism enabling it to rotate a transducer, thus providing an electrical signal indicative of the position of an aircraft control surface, such as a horizontal stabilizer. The stabilizer control surface is coupled to a rotating cable which drives a pointer mechanism which is located in the cockpit of the aircraft at the control stand. The pointer is driven by a small jackscrew assembly which responds to rotary output of the stabilizer cable to provide a linear extension or retraction reflecting the position of the control surface. The jackscrew assembly is coupled to a modified quadric chain linkage which operates to convert linear motion of the jackscrew into a substantially translatory displacement of one of the elements of the quadric-chain. An extension of this element is used to engage a link which converts the translatory displacement to an angular displacement of a rotary transducer which provides an electrical signal representative of the position of the aircraft control surface.

In a preferred embodiment, the invention comprises a rotary coupling adapted for providing a rotary output representative of the position of an aircraft control surface, an extensible coupling for converting the rotary output into a linear motion proportional thereto, and a quadric chain linkage adapted for providing an angular output to an electrical transducer, the transducer providing a signal indicative of the position of the aircraft control surface.

DESCRIPTION OF THE PREFERRED EMBODIMENT

Figure 3:
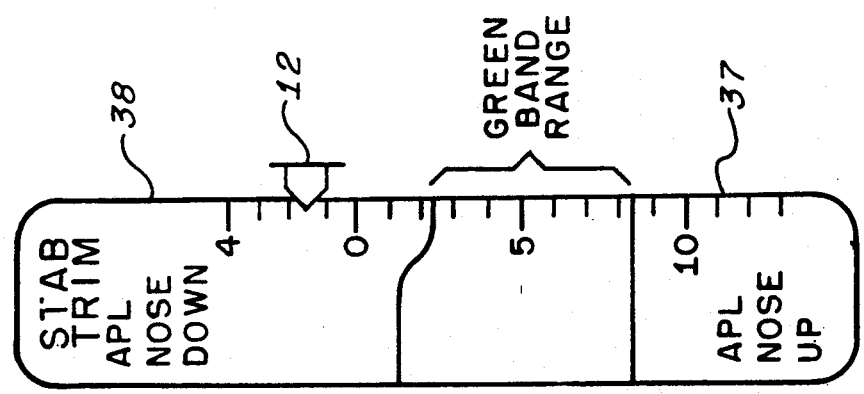
FIG. 3 is an illustration of a typical mechanical pointer scale for displaying the position of the horizontal stabilizer in the cockpit.
Figure 1:
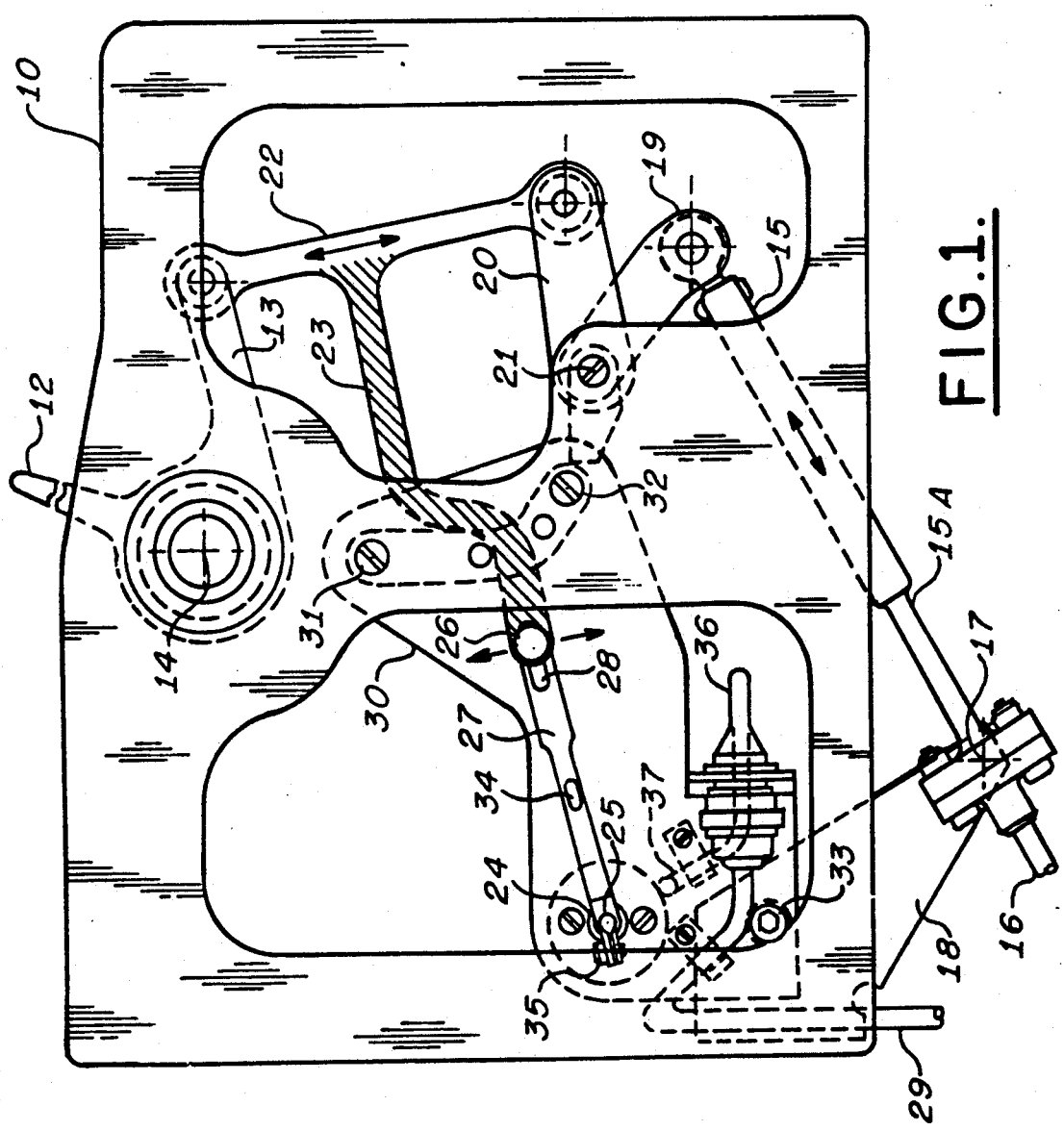
FIG. 1 is a cross sectional view of the apparatus of the present invention showing detailed views of the quadric-chain linkages coupled to an electrical transducer.

A typical configuration of an existing pointer mechanism is illustrated in FIG. 1 as modified by the present invention. It comprises a stationary frame member 10 which is part of the existing aircraft structure and, as shown, is typical of the left side of the stationary control stand between the Captain and the First Officer. An existing pointer 12 and attached linkage arm 13 rotate on an axis about a pivot point 14. Pointer 12 rotates adjacent to a calibrated scale 38 as shown in FIG. 3 to provide a visual display of the position of the horizontal stabilizer surface of the airplane. Pointer 12 is driven by a rotation of jackscrew 15A which extends and retracts an extensible link 15 under corresponding clockwise and counter-clockwise rotation of a flexible cable 16. Cable 16 is coupled to the aircraft's horizontal stabilizer. The cable extends from the cockpit to a multiple-turn input of the stabilizer displacement jackscrew. The extensible link 15 and the jackscrew 15A assembly is free to pivot about stationary axis 17 which is fixed to the stationary frame member 10 through a trunion support 18, which, in turn, is riveted to the support member 10. Linkage arms 19 and 20 are tied together in a fixed angular position and pivot about stationary axis 21. Extension and retraction of jackscrew assembly 15 and 15A causes rotation of linkage arms 19 & 20 about the axis 21. The free ends of linkage arms 13 and 20 are connected by a further linkage member 22. Thus, linkage members 13, 22, 20, and the stationary link defined by the support structure 10 between the pivotal axes 14 & 21 comprise a quadric-chain linkage. See, for example, H. Miller, "Analysis of Quadric-Chain Mechanisms", *Product Engineering*, February, 1951, pp 109–113.

The present invention is particularly adapted to retrofit of existing configurations wherein space considerations within the stationary frame 10 constrain the location of a rotary transducer 24 to be in a remote location with respect to the linkage which drives the pointer 12. Linkage member 22 is provided with a rigidly affixed extension arm 23. Thus, motion of linkage member 22 results in a transformation of the movement of member 22 to pin 26 at the end of extension arm 23. The distal end of extension arm 23 is provided with fixed pin 26 which engages slot 28 of a linkage member 27. Linkage member 27 is clamped to a transducer shaft 25 of transducer 24. Motion of pin 26 in slot 28 causes rotation of member 27 around the fixed axis of transducer 24. The electrical output of transducer 24 terminates on connector 36 where it can be coupled to aircraft cable 29 to provide electrical inputs to new aircraft subsystems which require such electrical data. The housing of transducer 24 and its output electrical wires 37 and connector 36 are retained in a fixed position relative to the stationary frame 10 by a bracket 30. Bracket 30 in turn is held in place by bolts 31 and 32 which attach to stationary frame 10 and by bolt 33 which attaches to the trunion plate 18.

In operation, alignment of the electrical output of transducer 24 with pointer 12 is obtained by choosing a specific position of the pointer as a reference. The corresponding reference angular position of the linkage member 27 with the housing of the transducer is determined by conventional geometric and trigonometric calculations. The location of calibration slot 34 on the linkage member 27 with respect to a stationary point on the bracket 30 is thus determined. Before engaging slot 28 with pin 26, member 27 is positioned an held firmly with respect to bracket 30 by a temporary connection at slot 34. Linkage member 27 is positioned loosely over the shaft 25 of transducer 24. The electrical output on connector 36 is monitored with suitable electrical instrumentation. Adjustment of the position of shaft 25 may be made by a screwdriver slot on the end of the shaft. When the desired electrical reference output has been obtained, member 27 is clamped firmly to the shaft 25 by means of clamp screw 35. The temporary connection at calibration slot 34 is then removed and the engagement is made between the pin 26 and slot 28 in linkage member 27, thus completing the calibration procedure.

The fixed axes of rotation of the elements of the mechanism are 14, 17, 21, and 25. When the horizontal stabilizer is driven to a new position, cable 16 is rotated mechanically and causes the extension and retraction of jackscrew assembly 15 and 15A. The extension and retraction of link 15 is proportional to the motion of the horizontal stabilizer causing rotation of linkage members 19 and 20 about stationary axis 21. This results in an essentially translatory motion of linkage member 22 when flexible cable 16 rotates. The motion of linkage member 22 is transferred to an identical motion of pin 26 at the end of extension arm 23. The translatory motion of extension arm 23 thus causes arm 27, which is engaged to pin 26 through slot 28, to rotate shaft 25 with respect to the housing of transducer 24, thus providing a corresponding electrical output. The electrical output may then be applied to new electrical subsystems being retrofitted into the aircraft.

Figure 2:
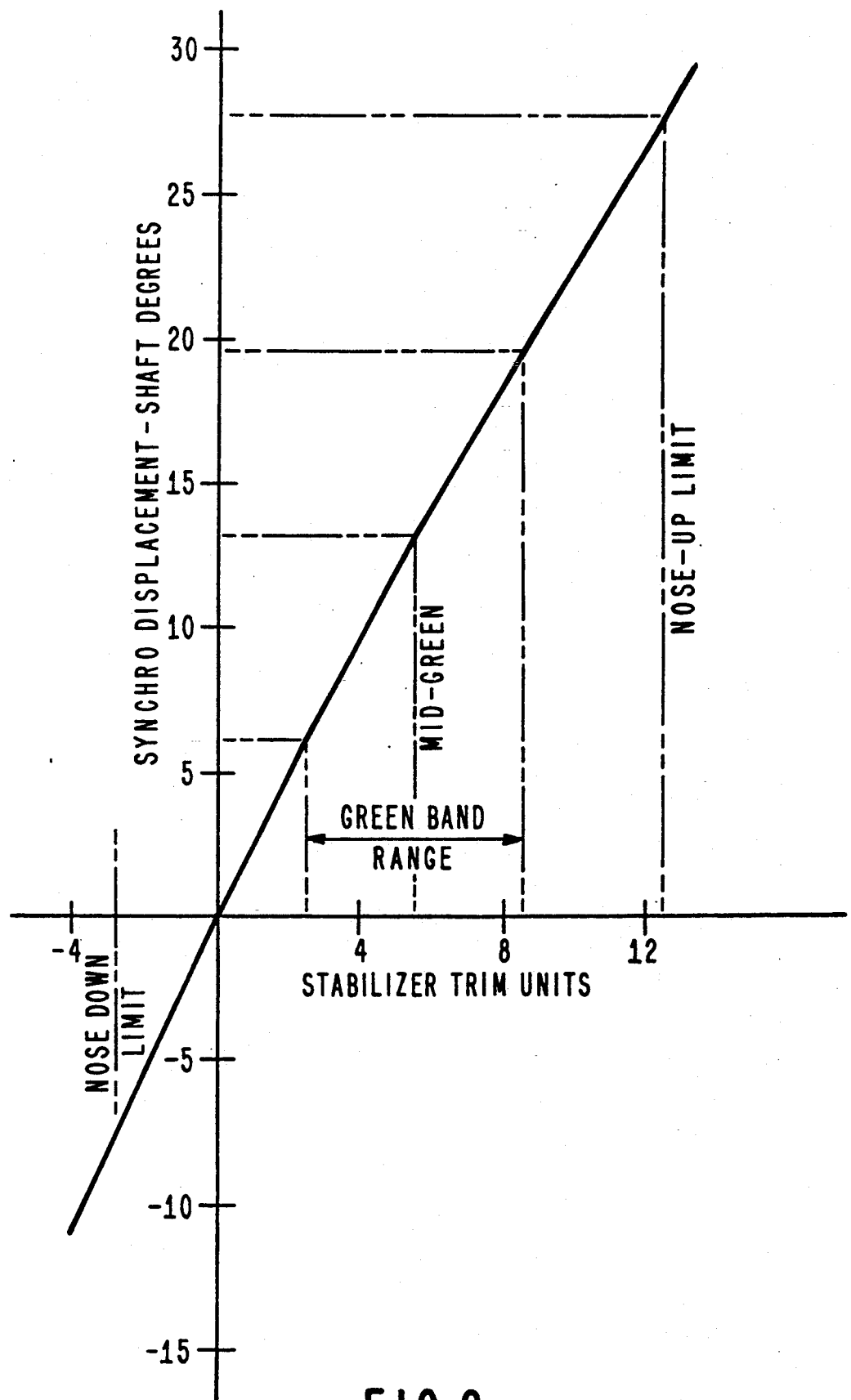
FIG. 2 is a graph showing the resulting displacement of the electrical transducer relative to displacement of the horizontal stabilizer position.

FIG. 2 is a graph illustrating the relative shaft rotation of the transducer 24 with respect to the motion of the stabilizer. The stabilizer is moved over a positive range of approximately 12 degrees, indicative of a nose up condition, and through a negative range of 4 degrees, indicative of a nose down condition, for a total range of approximately 16 degrees, corresponding to an angular transducer rotation of 35 degrees. The curve of FIG. 2 is plotted relative to the mechanical indicator scale 38 of FIG. 3.

It may be seen then that the present invention provides an electrical output which is a function of the position of an aircraft surface such as the horizontal stabilizer, where an electrical transducer must be retrofitted to an existing control stand with severe space constraints. The present invention solves the problem with a minimum of additional parts, it being well known that the failure probability of mechanical and electrical devices is generally directly proportional to the number of component parts and of their articulations; therefore, any simplifications in the design will result in improved reliability.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for providing an electrical signal indicative of the position of an aircraft control surface, comprising:

rotary coupling means having an input shaft operatively coupled to said control surface and an output shaft for providing a rotary output representative of a position of said control surface, extensible coupling means for receiving said output shaft and converting said rotary output into a linear motion proportional in magnitude to said position of said control surface, quadric chain linkage means coupled to receive said extensible coupling means for converting said linear motion into a substantially translatory displacement of a first linkage member, further comprising a second linkage member having a first end slideably coupled to said first linkage member and pivotedly adapted at a second end for converting said translatory displacement into a substantially angular motion, and an electrical transducer engaging said second end of said second linkage member for converting said angular motion into an electrical output proportional thereto and indicative of the position of said aircraft control surface.

2. An apparatus as set forth in claim 1, said quadric chain linkage means comprised of a third linkage member integrally defined by a stationary frame between first and second pivot points, and further comprised of a fourth linkage member having a first end coupled to mechanical indicator means at said first pivot point, a second end of said fourth linkage member pivotedly coupled to a first end of said first linkage member, a second end of said first linkage member pivotedly coupled to a first end of a fifth linkage member, said fifth linkage member having a second end pivotedly engaging said second pivot point and fixedly engaging a sixth linkage member angularly disposed with respect to said fifth linkage member, said sixth linkage member pivotedly coupled to said extensible coupling means, said first, third, fifth, and sixth linkage members so constructed and adapted for converting rotary motion of said sixth linkage member about said second pivot point to said translatory displacement of said first linkage member and rotation of said fourth linkage member about said first pivot point.

3. An apparatus as set forth in claim 2, said extensible coupling means further comprising jackscrew means for converting rotary motion of said output shaft to linear extension and retraction of said jackscrew means, and pivotedly engaging said sixth linkage member of said quadric-chain linkage means so that activity of said jackscrew means is coupled to provide corresponding translatory displacement of said first linkage member.

4. An apparatus as set forth in claim 3, wherein said first linkage member is further comprised of a longitudinal member disposed in the plane of said second linkage member and distally provided with a fixed pin defining a third pivot point, said pin slideably coupled at said third pivot point to said second linkage member, said second linkage member distally engaging a movable member of said transducer, whereby translatory motion of said longitudinal member results in angular displacement of said second linkage member about said third pivot point, so that said movable member of said transducer is displaced proportional to said translatory motion with respect to a predetermined operative position.

5. An apparatus as set forth in claim 4, said second linkage member further comprising positional calibration means for setting said transducer to a predetermined operative position with respect to said mechanical indicator means and said aircraft control surface.

6. An apparatus as set forth in claim 5, wherein said stationary frame is adapted for mounting on an aircraft structure for supporting said rotary coupling means, said extensible coupling means, said quadric-chain linkage means, said transducer, and said mechanical indicator means.

7. An apparatus as set forth in claim 6, wherein said mechanical indicator means is driveably engaged by said quadric-chain linkage means and pivotedly adapted to provide a visual indication of a given position of said aircraft control surface in synchronism with said electrical output.

* * * * *